United States Patent
Lin et al.

(10) Patent No.: US 9,052,583 B2
(45) Date of Patent: Jun. 9, 2015

(54) PORTABLE ELECTRONIC DEVICE WITH MULTIPLE PROJECTING FUNCTIONS

(71) Applicant: LITE-ON TECHNOLOGY CORPORATION, Taipei (TW)

(72) Inventors: Wei-Chih Lin, Hsinchu (TW); Chih-Chieh Yu, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 203 days.

(21) Appl. No.: 13/678,821

(22) Filed: Nov. 16, 2012

(65) Prior Publication Data

US 2014/0016104 A1 Jan. 16, 2014

(30) Foreign Application Priority Data

Jul. 13, 2012 (CN) .......................... 2012 1 0243183

(51) Int. Cl.
| | |
|---|---|
| *G03B 21/28* | (2006.01) |
| *G03B 21/14* | (2006.01) |
| *G06F 1/16* | (2006.01) |
| *H04N 9/31* | (2006.01) |
| *G03B 21/20* | (2006.01) |

(52) U.S. Cl.
CPC .............. *G03B 21/28* (2013.01); *G03B 21/14* (2013.01); *G03B 21/2033* (2013.01); *G06F 1/1673* (2013.01); *H04N 9/3129* (2013.01); *H04N 9/3173* (2013.01)

(58) Field of Classification Search
CPC ................................ G03B 21/28; G03B 21/00
USPC ................... 353/119, 82, 94, 98, 99; 348/794
See application file for complete search history.

(56) References Cited

U.S. PATENT DOCUMENTS

| | | | |
|---|---|---|---|
| 6,854,850 B2* | 2/2005 | Yaniv | 353/94 |
| 8,297,758 B2* | 10/2012 | Choi et al. | 353/94 |
| 2003/0174125 A1 | 9/2003 | Torunoglu et al. | |
| 2008/0055566 A1* | 3/2008 | Yun | 353/82 |
| 2009/0027628 A1* | 1/2009 | Hoshino et al. | 353/70 |
| 2010/0195058 A1 | 8/2010 | Ritz | |
| 2010/0231868 A1* | 9/2010 | Chen et al. | 353/82 |
| 2010/0245235 A1 | 9/2010 | An et al. | |
| 2010/0302516 A1 | 12/2010 | Rehn | |

* cited by examiner

*Primary Examiner* — William C Dowling
*Assistant Examiner* — Ryan Howard
(74) *Attorney, Agent, or Firm* — WPAT, PC; Justin King

(57) ABSTRACT

A portable electronic device with multiple projecting functions is provided. The portable electronic device includes a main body, a projecting module, and a switching mechanism. The projecting module is disposed within the main body for generating an image beam. The switching mechanism is movably disposed on the main body. When the switching mechanism is located at a first position, the image beam is projected along a first projecting path, and the portable electronic device is in a first operating mode. When the switching mechanism is located at a second position, the image beam is projected along a second projecting path, and the portable electronic device is in a second operating mode.

8 Claims, 3 Drawing Sheets

PORTABLE ELECTRONIC DEVICE WITH MULTIPLE PROJECTING FUNCTIONS

This application claims the benefit of People's Republic of China Application Serial No. 201210243183.0, filed Jul. 13, 2012, the subject matter of which is incorporated herein by reference.

FIELD OF THE INVENTION

The present invention relates to a portable electronic device, and more particularly to a portable electronic device with multiple projecting functions.

BACKGROUND OF THE INVENTION

Nowadays, projectors are widely used in many circumstances. For example, projectors can be used for presentations or video playback. For enhancing the visual effect, most projectors are employed to project images on large-sized screens. Recently, with increasing development of science and technology, a pico projector (also referred as a microdisplay) has been introduced into the market. The pico projector is designed to have small size and light weightiness. Generally, the pico projector is embedded into a portable electronic device (e.g. a mobile phone or a personal digital assistant), so that the pico projector may be directly utilized by the user. Alternatively, in some other situations, the pico projector is separated from the portable electronic device. Consequently, the pico projector may be operated after the pico projector is in communication with the portable electronic device. By mean of the pico projector, a corresponding image or data may be projected on a flat surface in order to be viewed by the user. In such way, the image may be displayed in a maneuverable and real-time manner.

Conventionally, the pico projector utilizes a reflective LCD panel produced according to an LCoS (liquid crystal on silicon) technology, which is also referred as an LCoS panel. The reflective LCD panel comprises an array of liquid crystal display units. The images shown on all liquid crystal display units are combined together to produce a resultant image. That is, after a light beam from a light source is irradiated on the LCoS panel, the light beam is reflected and modulated to produce the resultant image. Moreover, the light source used in the pico projector is for example a light emitting diode (LED).

Recently, the trend of designing the operating interface of the portable electronic device is toward succinctness. Consequently, a virtual keyboard utilizing an infrared sensing technology is developed. The portable electronic device with the virtual keyboard function may project a laser beam to create a virtual keyboard on a flat surface in front of the portable electronic device. For example, the virtual keyboard is a standard QWERTY keyboard. In other words, the contents of the virtual keyboard comprise the images of the keys of a physical keyboard. Moreover, the portable electronic device with the virtual keyboard function has an optical sensor for detecting the motion of the user's finger according to an infrared sensing technology. When a corresponding key image of the virtual keyboard is pressed or touched virtually by the user's finger, the portion of the laser beam corresponding to the position of the key image is blocked or sheltered by the user's finger. According to the blocked or sheltered portion of the light beam, the optical sensor can realize the operating status or the inputted content of using the virtual keyboard. Some conventional virtual keyboards are disclosed in for example US Patent Publication Nos. 20030174125 and 20100245235.

Similarly, the device for creating the virtual keyboard may be embedded into a portable electronic device or separated from the portable electronic device. In a case that the device for creating the virtual keyboard is embedded into the portable electronic device, the virtual keyboard may be directly projected on the flat surface to be operated. Whereas, in a case that the device for creating the virtual keyboard is separated from the portable electronic device, the operating status of the virtual keyboard may be transmitted from the virtual keyboard creating device to the portable electronic device (e.g. a personal computer, a notebook computer, a mobile phone or a tablet personal computer) in a wired transmission manner or a wireless transmission manner. By using the virtual keyboard, the portable electronic device may be operated more intuitively and conveniently. Under this circumstance, the applications of the portable electronic device are not restricted to the less number of physical keys or the hard-to-use graphics-based icons. Moreover, the use of the virtual keyboard can reduce the fabricating cost because the physical keyboard is exempted. Moreover, the use of the virtual keyboard can expand the range of the displaying zone and facilitate inputting commands.

From the above discussions, the function of the pico projector and the function of the virtual keyboard creating device are somewhat distinguished by the projecting approaches and the projecting positions. For integrating these two functions into the same portable electronic device, the projecting units for the pico projector and the virtual keyboard creating device should be disposed on different positions. Alternatively, the projecting directions of one projecting unit for the pico projector and the virtual keyboard creating device may be switched by a rotating mechanism. In such way, the fabricating cost or the overall volume is increased. Therefore, there is a need of providing a portable electronic device with the projecting function of a pico projector and the projecting function of creating a virtual keyboard by properly designing the hardware components, so that the fabricating cost and the overall volume are reduced.

SUMMARY OF THE INVENTION

The present invention provides a portable electronic device with multiple projecting functions. The projecting function of a pico projector and the projecting function of creating a virtual keyboard are integrated into the same portable electronic device by simply employing a switching mechanism, so that the fabricating cost and the overall volume are reduced.

An embodiment of the present invention provides a portable electronic device with multiple projecting functions. The portable electronic device includes a main body, a projecting module, and a switching mechanism. The projecting module is disposed within the main body for generating an image beam. The switching mechanism is movably disposed on the main body. When the switching mechanism is located at a first position, the image beam is projected along a first projecting path, and the portable electronic device is in a first operating mode. When the switching mechanism is located at a second position, the image beam is projected along a second projecting path, and the portable electronic device is in a second operating mode.

Another embodiment of the present invention provides a portable electronic device with multiple projecting functions. The portable electronic device includes a main body, a projecting module, and a reflective mirror. The projecting module is disposed within the main body for generating an image beam. The reflective mirror is movably disposed on the main body. The image beam has a first projecting path without reflecting by the reflective mirror for using as an ordinary image projecting function, and a second projecting path with reflecting by the reflective mirror for using as a virtual keyboard creating function.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
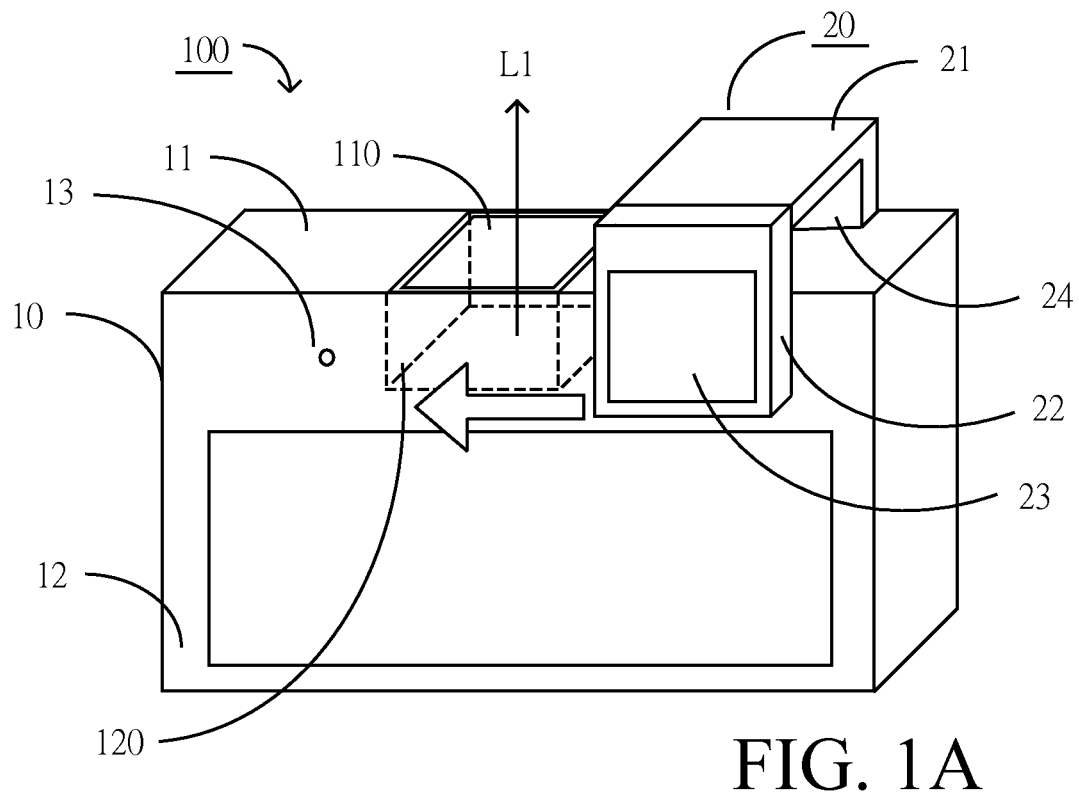
FIG. 1A is a schematic perspective view illustrating a portable electronic device with multiple projecting functions according to an embodiment of the present invention, in which the portable electronic device is in a first operating mode.
Figure 1B:
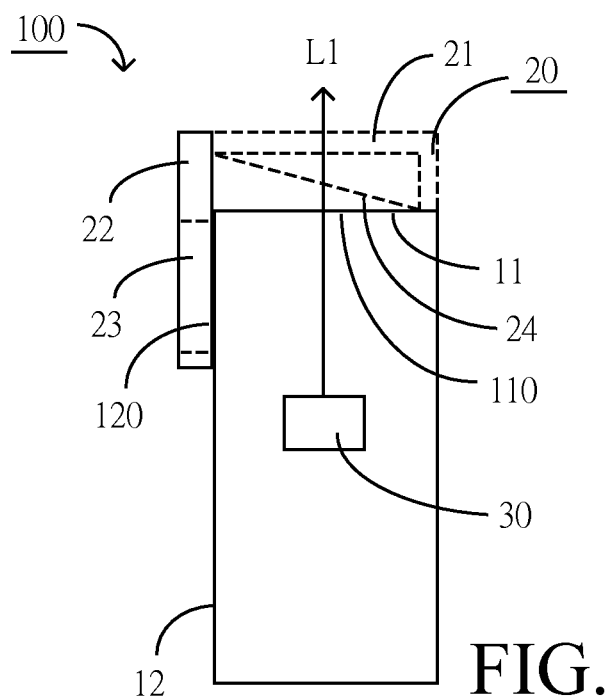
FIG. 1B is a schematic side view illustrating the portable electronic device of FIG. 1A.

The present invention provides a portable electronic device with multiple projecting functions. FIG. 1A is a schematic perspective view illustrating a portable electronic device with multiple projecting functions according to an embodiment of the present invention, in which the portable electronic device is in a first operating mode. FIG. 1B is a schematic side view illustrating the portable electronic device of FIG. 1A. As shown in FIG. 1A, the portable electronic device 100 comprises a main body 10 and a switching mechanism 20. The main body 10 has a first surface 11 and a second surface 12. The switching mechanism 20 is movably disposed on the first surface 11. As shown in FIG. 1B, the portable electronic device 100 further comprises a projecting module 30. The projecting module 30 is disposed within the main body 10 for generating an image beam. In a case that the portable electronic device 100 is in the first operating mode, the image beam is outputted from the first surface 11 along a first projecting path L1.

From the above discussions, the portable electronic device 100 has at least two projecting functions. That is, the portable electronic device 100 has an ordinary image projecting function and a virtual keyboard creating function. The ordinary image projecting function is similar to the projecting function of a pico projector (also referred as a pico projecting function). In the first operating mode, the ordinary image projecting function is implemented. Whereas, the virtual keyboard creating function is implemented in a second operating mode, which will be illustrated later.

From the above discussions, the portable electronic device 100 has the switching mechanism 20, and the switching mechanism 20 is movably disposed on the first surface 11. That is, the switching mechanism 20 may be moved by the user's finger (e.g. in the direction indicated as the arrow shown in FIG. 1A). By moving the switching mechanism 20, the projecting module 30 may be switched between the first operating mode and the second operating mode through associated circuitry configurations. Moreover, the portable electronic device 100 further comprises a first window 110 and a second window 120. The first window 110 is disposed on the first surface 11. The second window 120 is disposed on the second surface 12. The switching mechanism 20 comprises a first shell surface 21, a second shell surface 22, a third window 23, and a reflective mirror 24. The third window 23 is disposed on the second shell surface 22. The reflective mirror 24 is an essential component for achieving the virtual keyboard creating function (i.e. in the second operating mode).

In a case that the switching mechanism 20 is disposed on the first surface 11 and located at a first position as shown in FIG. 1A, the portable electronic device 100 is in the first operating mode. In the first operating mode, the image beam generated by the projecting module 30 is projected along the first projecting path L1, transmitted through the first window 110, and outputted from the first surface 11. The image beam generated by the projecting module 30 contains the image or content (e.g. the image information) to be projected by the user. For example, the image information includes a picture, a video data or a character data, which is stored in the portable electronic device 100. After the portable electronic device 100 is aligned with a projecting surface or wall ahead of or directly ahead of the portable electronic device 100, the ordinary image projecting function may be implemented.

Figure 2A:
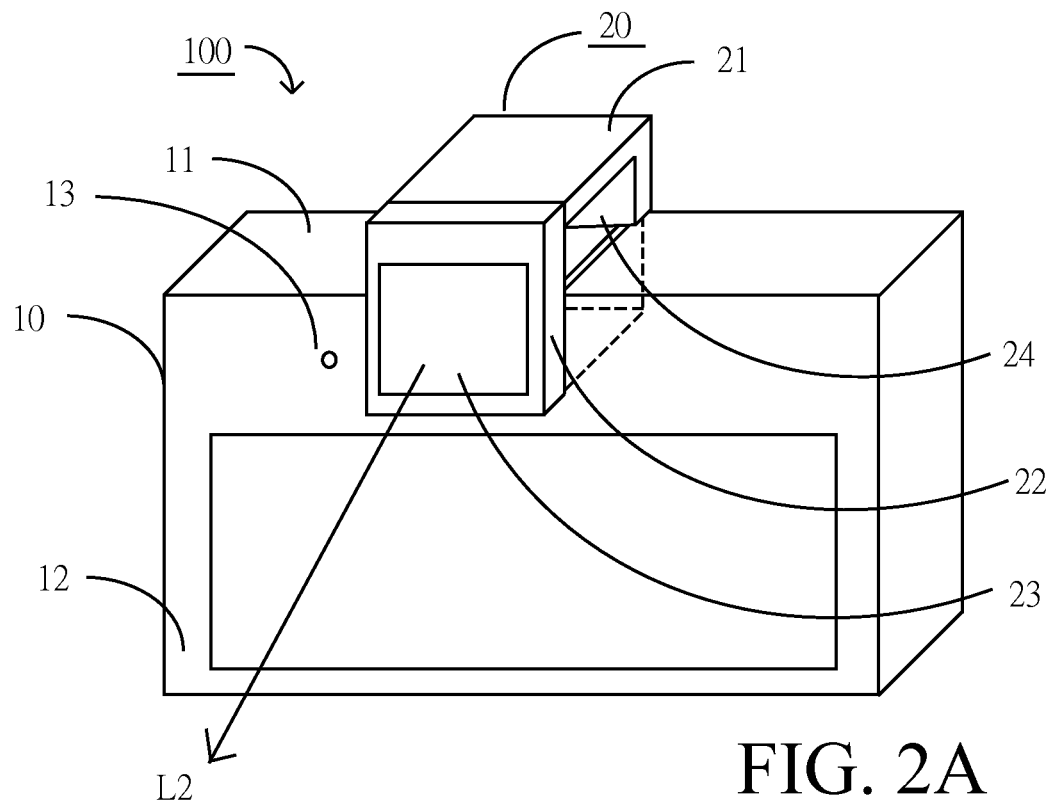
FIG. 2A is a schematic perspective view illustrating a portable electronic device with multiple projecting functions according to an embodiment of the present invention, in which the portable electronic device is in a second operating mode.
Figure 2B:
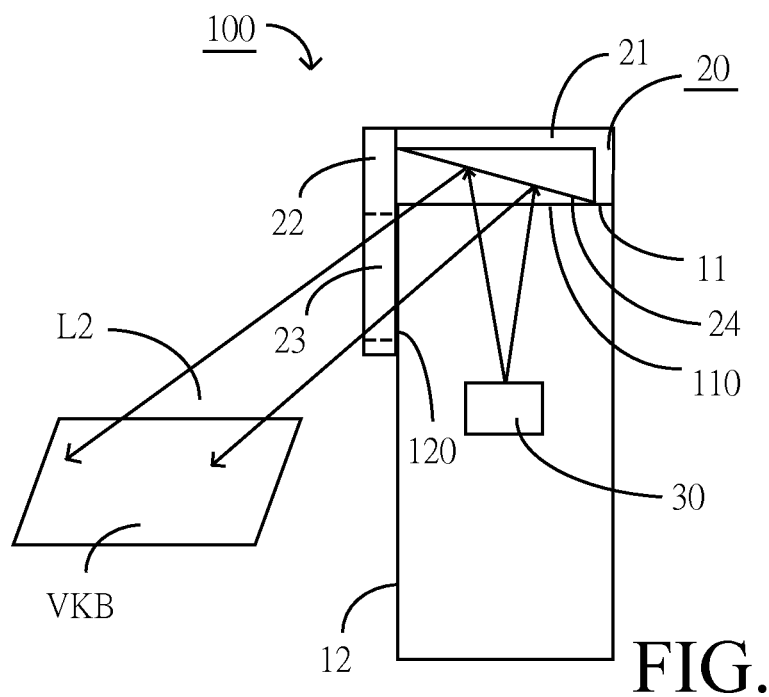
FIG. 2B is a schematic side view illustrating the portable electronic device of FIG. 2A.

FIG. 2A is a schematic perspective view illustrating a portable electronic device with multiple projecting functions according to an embodiment of the present invention, in which the portable electronic device is in a second operating mode. FIG. 2B is a schematic side view illustrating the portable electronic device of FIG. 2A. In a case that the switching mechanism 20 is moved from the first position as shown in FIG. 1A to a second position as shown in FIG. 2A, the first window 110 is covered by the first shell surface 21 of the switching mechanism 20. Under this circumstance, the reflective mirror 24 is aligned with the first window 110. In addition, the second window 120 is covered by the second shell surface 22, so that the third window 23 on the second shell surface 22 is aligned with the second window 120. In this embodiment, the image beam generated by the projecting module 30 is reflected by the reflective mirror 24 and projected along a second projecting path L2 (see FIGS. 2A and 2B).

Moreover, in this embodiment, the reflective mirror 24 of the switching mechanism 20 is inclined relative to the first surface 11 by a tilting angle. Consequently, when the reflective mirror 24 is moved to the position corresponding to the first window 110, the projecting path of the image beam generated by the projecting module 30 is switched from the first projecting path L1 to the second projecting path L2. Under this circumstance, the image beam is sequentially transmitted through the second window 120 and the third window 23 and outputted from the second surface 12.

In this embodiment, image beam along the second projecting path L2 creates a virtual keyboard image VKB. In the second operating mode, the portable electronic device 100 may be stood upright on a plane or a desk surface. Consequently, the virtual keyboard image VKB may be aslant projected on the plane or the desk surface. Moreover, the portable electronic device 100 further comprises an optical sensor 13. The optical sensor 13 is disposed on the second surface 12, and faces the same direction as the second window 120 and the third window 23. In a case that the virtual keyboard image VKB is virtually pressed or touched by the user's finger, the portion of the image beam corresponding to the pressed or touched position of the virtual keyboard image VKB is sheltered by the user's finger. By detecting the sheltered portion of the virtual keyboard image VKB, the optical sensor 13 can realize the operating status or the inputted content of using the virtual keyboard.

In this embodiment, the portable electronic device 100 with multiple projecting functions is for example a mobile phone, a personal digital assistant or a tablet personal computer. In accordance with the concepts of the present invention, two projecting functions are integrated into the same portable electronic device. According to the practical requirements, the user may selectively enable a desired projecting function of the portable electronic device. For example, the portable electronic device 100 is a mobile phone, and the display screen of the portable electronic device 100 faces the same direction as the optical sensor 13, the second window 120 and the third window 23 (i.e. the display screen is disposed on the second surface 12). While the aslant-displayed virtual keyboard image VKB is viewed and operated by the user, the inputted contents of operating the virtual keyboard image VKB may be simultaneously shown on the display screen to be viewed by the user. On the other hand, for implementing the projecting function of a pico projector (i.e. the ordinary image projecting function), the user may simply hold the main body of the mobile phone and move the switching mechanism 20 to the designated position.

From the above discussions, the portable electronic device 100 of the present invention has multiple projecting functions. Since the switching mechanism 20 has small size and light weightiness, the projecting angle, the projecting direction, the projecting position and the projecting zone for implementing different projecting functions may be effectively switched without the need of largely increasing the overall volume of the portable electronic device 100. Moreover, the use of the reflective mirror 24 does not largely increase the fabricating cost. Under this circumstance, the projecting function of a pico projector and the projecting function of creating a virtual keyboard may be integrated into the same portable electronic device of the present invention by properly designing the hardware components.

In the above embodiment, the reflective mirror 24 as shown in FIGS. 1B and 2B are illustrated by referring to a plane mirror. Consequently, the virtual keyboard image VKB has small distortion. It is noted that, numerous modifications and alterations may be made while retaining the teachings of the invention. For example, since the virtual keyboard image VKB is reflected by the reflective mirror 24 and aslant projected on the desk surface, the light distance from the reflective mirror 24 to the desk surface and the projecting angle may be adjusted by changing the tilting angle of the reflective mirror 24 relative to the first surface 11. Under this circumstance, the projecting position of the image beam along the second projecting path L2 may be changed to a nearer position or a farther position. For example, the reflective mirror 24 may have a shaft. The tilting angle of the reflective mirror 24 relative to the first surface 11 may be adjusted by rotating the shaft.

Figure 3A:
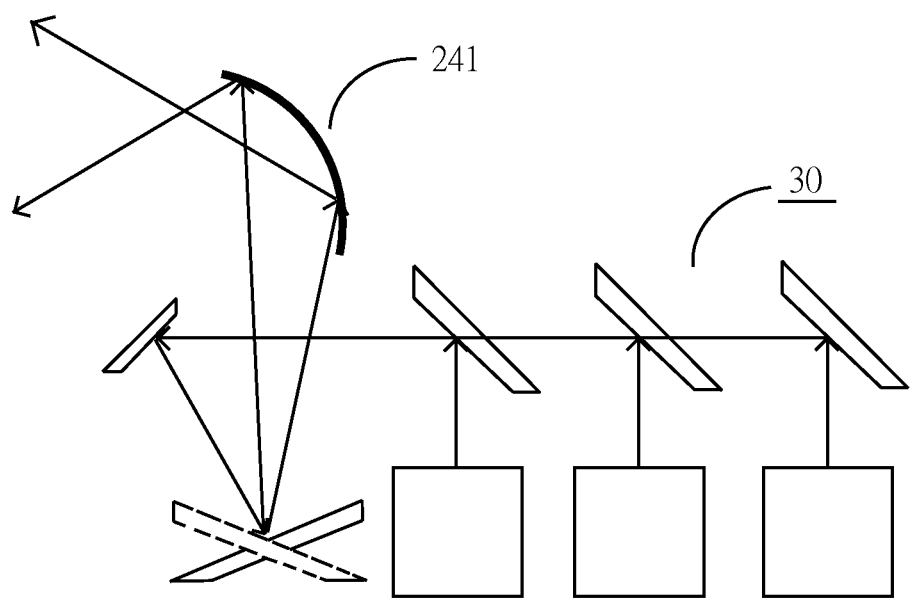
FIGS. 3A and 3B schematically illustrate other two exemplary reflective mirrors used in the portable electronic device of the present invention.
Figure 3B:
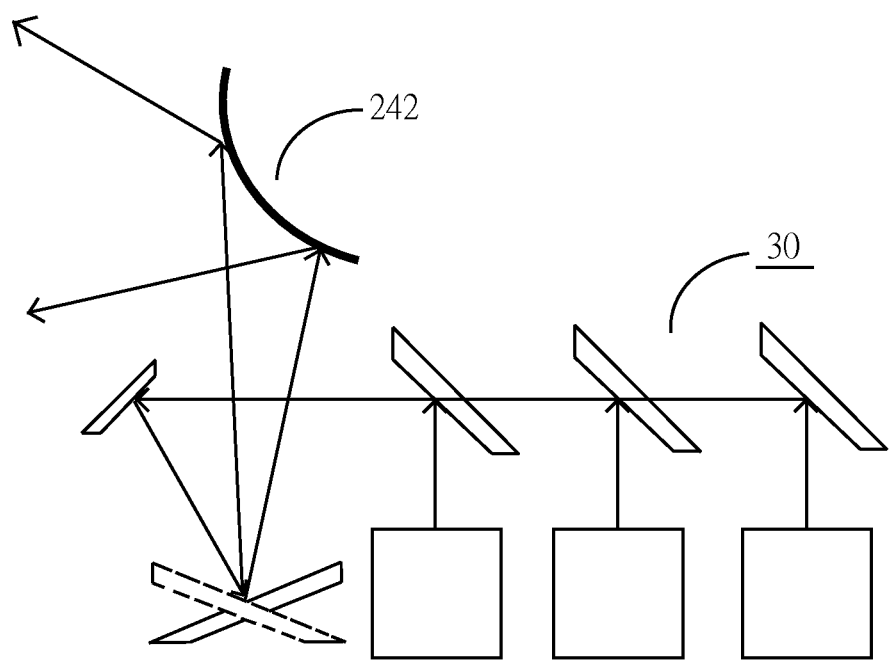

Alternatively, in some embodiment, the projecting zone of the image beam along the second projecting path L2 may be expanded or shrunken by changing the curvature of the reflective mirror 24. Please refer to FIGS. 3A and 3B. FIG. 3A schematically illustrates another exemplary reflective mirror used in the portable electronic device of the present invention. As shown in FIG. 3A, the reflective mirror 241 is a spherical mirror having a negative curvature. FIG. 3B schematically illustrates another exemplary reflective mirror used in the portable electronic device of the present invention. As shown in FIG. 3B, the reflective mirror 242 is a spherical mirror having a positive curvature. Since the reflective mirror 241 or 242 is not a plane mirror, the magnification of the projected image is not equal to 1. As shown in FIGS. 3A and 3B, the reflective mirror is the spherical mirror having a constant curvature. Alternatively, the reflective mirror may be designed as a non-spherical mirror in order to produce different projecting effects.

From the above discussions, the present invention provides a portable electronic device with multiple projecting functions. The portable electronic device may implement different projecting functions without the need of largely increasing the overall volume of the portable electronic device. Moreover, the portable electronic device with multiple projecting functions is cost-effective. The projecting function of a pico projector and the projecting function of creating a virtual keyboard may be integrated into the same portable electronic device of the present invention. By simply moving the switching mechanism between a first position and a second position, the projecting function of the pico projector or the projecting function of creating the virtual keyboard may be selectively implemented. Moreover, according to the practical requirement, the shape of the reflective mirror may be modified in order to produce a desired projecting effect. Consequently, the portable electronic device of the present invention can implement multiple projecting functions while eliminating the drawbacks of the conventional portable electronic device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable electronic device with multiple projecting functions, the portable electronic device comprising:
   a main body having a first surface and a second surface;
   a first window disposed on the first surface of the main body;
   a second window disposed on the second surface of the main body;
   a projecting module disposed within the main body for generating an image beam; and
   a switching mechanism movably disposed on the main body, wherein when the switching mechanism is located at a first position, the image beam is projected along a first projecting path, wherein when the switching mechanism is located at a second position, the image beam is projected along a second projecting path,
   wherein the switching mechanism comprises a first shell surface, a second shell surface, a third window, and a reflective mirror, wherein the third window is disposed on the second shell surface, wherein when the switching mechanism is located at the second position, the first window is covered by the first shell surface of the switching mechanism such that the reflective mirror is aligned with the first window, and the second window is covered by the second shell surface of the switching mechanism such that the third window is aligned with the second window.

2. The portable electronic device as claimed in claim 1, wherein the reflective mirror is a plane mirror.

3. The portable electronic device as claimed in claim 1, wherein a projecting zone of the image beam along the second projecting path is expanded or shrunken by changing a curvature of the reflective mirror.

4. The portable electronic device as claimed in claim 1, wherein the reflective mirror is a spherical mirror, and the spherical mirror has a positive curvature or a negative curvature.

5. The portable electronic device as claimed in claim 1, wherein the reflective mirror is a non-spherical mirror.

6. A portable electronic device with multiple projecting functions, the portable electronic device comprising:

a main body;
a projecting module disposed within the main body for generating an image beam; and
a reflective mirror movably disposed on the main body,
wherein the image beam has a first projecting path without reflecting by the reflective mirror for use as an ordinary image projecting function, and a second projecting path with reflecting by the reflective mirror for use as a virtual keyboard creating function,
wherein the reflective mirror is a spherical mirror, and the spherical mirror has a positive curvature or a negative curvature.

7. The portable electronic device as claimed in claim 6, wherein the reflective mirror is at a first position when the image beam has the first projecting path, and the reflective mirror is at a second position when the image beam has the second projecting path.

8. The portable electronic device as claimed in claim 6, wherein the image beam is selected to have alternatively the first projecting path and the second projecting path.

* * * * *